United States Patent [19]

Garnier et al.

[11] Patent Number: 5,088,815
[45] Date of Patent: Feb. 18, 1992

[54] LASER DEVICE FOR MEASURING WIND SPEEDS AT MEDIUM ALTITUDES BY USING A DOPPLER EFFECT

[75] Inventors: Anne Garnier, Cachan; Marie L. Chanin, Verrieres le Buisson; Alain Hauchecorne, Versailles; Jacques C. Porteneuve, Verrieres, all of France

[73] Assignee: Centre National de la Recherche Scientifique, France

[21] Appl. No.: 542,961

[22] Filed: Jun. 22, 1990

[30] Foreign Application Priority Data

Jun. 26, 1989 [FR] France .................... 89 08462

[51] Int. Cl.$^5$ .................... G01P 3/36; G02B 5/28; G01N 21/00; G01B 9/02
[52] U.S. Cl. .................... 356/28.5; 356/342; 356/352; 359/589; 359/891
[58] Field of Search .................... 356/28.5, 342, 352; 350/163, 166, 317

[56] References Cited

U.S. PATENT DOCUMENTS

| | | | |
|---|---|---|---|
| 3,164,665 | 1/1965 | Stello | 350/166 |
| 3,282,148 | 11/1966 | Yamada | 356/352 |
| 3,410,626 | 11/1968 | Magrath | 350/166 |
| 3,712,980 | 1/1973 | Norton | 350/166 |
| 3,788,743 | 1/1974 | George | 356/28.5 X |
| 3,795,448 | 3/1974 | Fletcher et al. | 356/28 |
| 4,195,931 | 4/1980 | Hara | 356/346 |
| 4,429,994 | 2/1984 | Guagliardo et al. | 356/28.5 |
| 4,558,950 | 12/1985 | Ulrich et al. | 356/352 X |
| 4,735,503 | 4/1988 | Werner et al. | 356/28.5 |

FOREIGN PATENT DOCUMENTS 0204295 12/1986 European Pat. Off. .

OTHER PUBLICATIONS

Valette et al., "Integrated-optical circuits achieved by planar technology on silicon substrates: application to the optical spectrum analyser", *IEEE Proceedings Section A a I*, vol. 131, No. 5, Oct. 1984, pp. 325-331.

Primary Examiner—Stephen C. Buczinski
Attorney, Agent, or Firm—Hill, Van Santen, Steadman & Simpson

[57] ABSTRACT

A device for measuring the speed of the wind at medium altitude by the Doppler effect within the visible frequency range comprises a laser which emits pulses of light, a telescope which receives a scattered light and an interferometer used to measure the spectral shift of the scattered light in relation to the emitted pulse of light. The interferometer is a Fabry-Perot interferometer in which a part of one of the two mirrors of the interferometer is covered with an excess thickness of silica to form two separate filters. The spacing of the two mirrors and the excess thickness of silica are determined in such a manner that the pass bands of each one of the two filters thus constructed are centered on the flanks of the spectral distribution of the backscattered light.

11 Claims, 5 Drawing Sheets

FABRY-PEROT INTERFEROMETER

LASER DEVICE FOR MEASURING WIND SPEEDS AT MEDIUM ALTITUDES BY USING A DOPPLER EFFECT

The present invention relates to a device for measuring the speed of the wind at medium altitude by the Doppler effect within the visible frequency range.

The measurement of the speed of the wind is of great importance, both as regards the acquisition of a better knowledge of our environment and also as regards weather forecasts.

The measurement of this speed at low altitude may be performed easily using radiosonde measurements, while at high altitude this speed may be measured using radars.

On the other hand, there is no satisfactory method permitting the continuous measurement of the speed of the wind at medium altitude, that is to say at altitudes within the range between 25 and 60 km. These are generally measurements made from rockets which permit these measurements to be carried out. This type of measurement is costly, and the measurements cannot therefore be repeated as frequently as would be desirable.

The measurement of the speed of the wind by the Doppler effect is a well known method. According to the new method described here, laser pulses of specified frequencies are emitted and the light backscattered by the Rayleigh effect is analyzed. In the course of its interaction with the atmosphere, the laser line has undergone a Doppler broadening and a spectral shift corresponding to the speed of the wind in the sighting direction.

The measurement of the spectral shift permits the speed of the wind in the sighting direction to be obtained.

A similar method is known for measurements from the ground or at low altitude and, in all cases, at a small distance from the emitting laser. Until the present time, it was considered impossible to apply this method for the measurement of the speed of the wind at medium altitude, since the backscattered flux capable of being received was considered as insufficient to permit the measurement of the spectral shift.

The problem underlying the invention is thus to propose a device which permits a spectral shift measurement on the basis of a small luminous flux which can be utilized for the measurement of the speed of the wind at medium altitude.

The Fabry-Perot interferometer, which consists of two face to face parallel surfaces which are highly reflective, is known to permit the performance of measurements of frequencies with a high resolution. Nevertheless, the utilization thereof for the measurement of the spectral shift in a device for measuring the speed of the wind by the Doppler effect does not of itself constitute a method permitting a measurement at medium altitude.

Accordingly, the invention relates to a device for measuring the speed of the wind at medium altitude by the Doppler effect within the visible frequency range, in which device a laser emits pulses, a telescope receives the light scattered by the Rayleigh effect, an interferometer is used to measure the spectral shift of the scattered light in relation to the emitted light.

According to the invention, the interferometer is a monolithic Fabry-Perot interferometer constructed of silica, in which a part of one of the mirrors is covered with an excess thickness, the spacing of the mirrors and the excess thickness being determined in such a manner that the pass bands of each one of the two filters thus constructed are centered on the flanks of the spectral distribution of the backscattered light.

According to a preferred embodiment of the invention, the receiving system comprises a plurality of telescopes for each direction of measurement.

The invention will be described in detail with reference to the figures, in which.

The device for measuring the speed of the wind at medium altitude by the Doppler effect within the visible frequency range comprises a laser 1 which emits pulses. This laser is stable and emits a spectrally pure light. Use will preferably be made of a longitudinal and transverse monomode YAG pulsed laser which emits a monochromatic beam at a wavelength of 532 nm.

Figure 1:
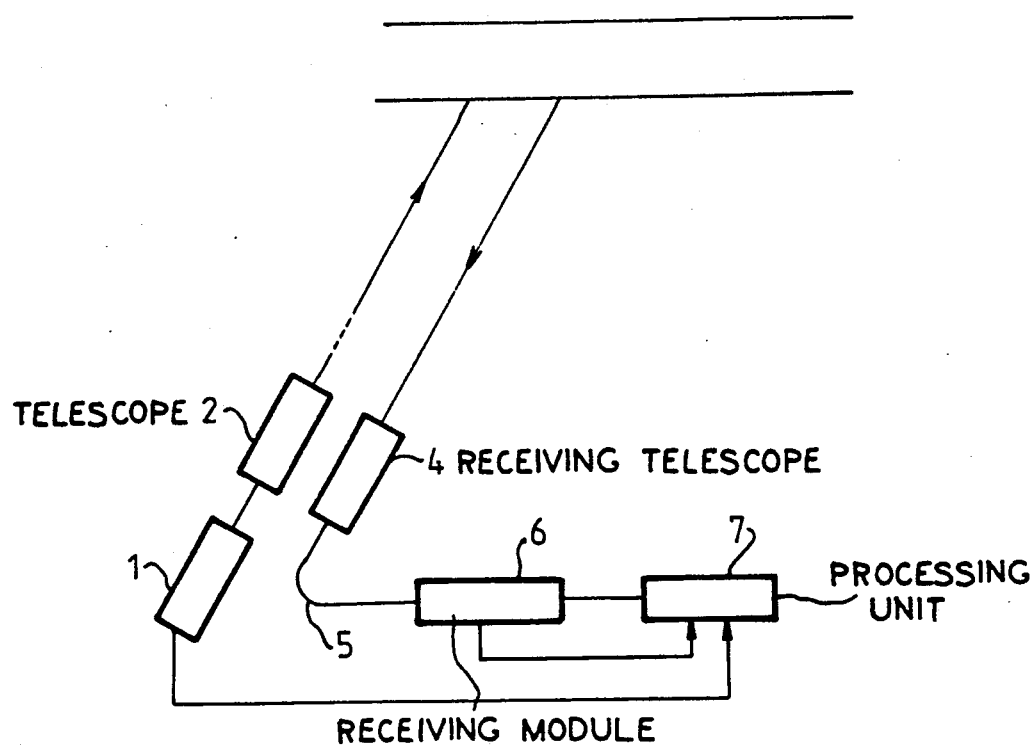
FIG. 1 is a basic diagram of the invention.
Figure 6:
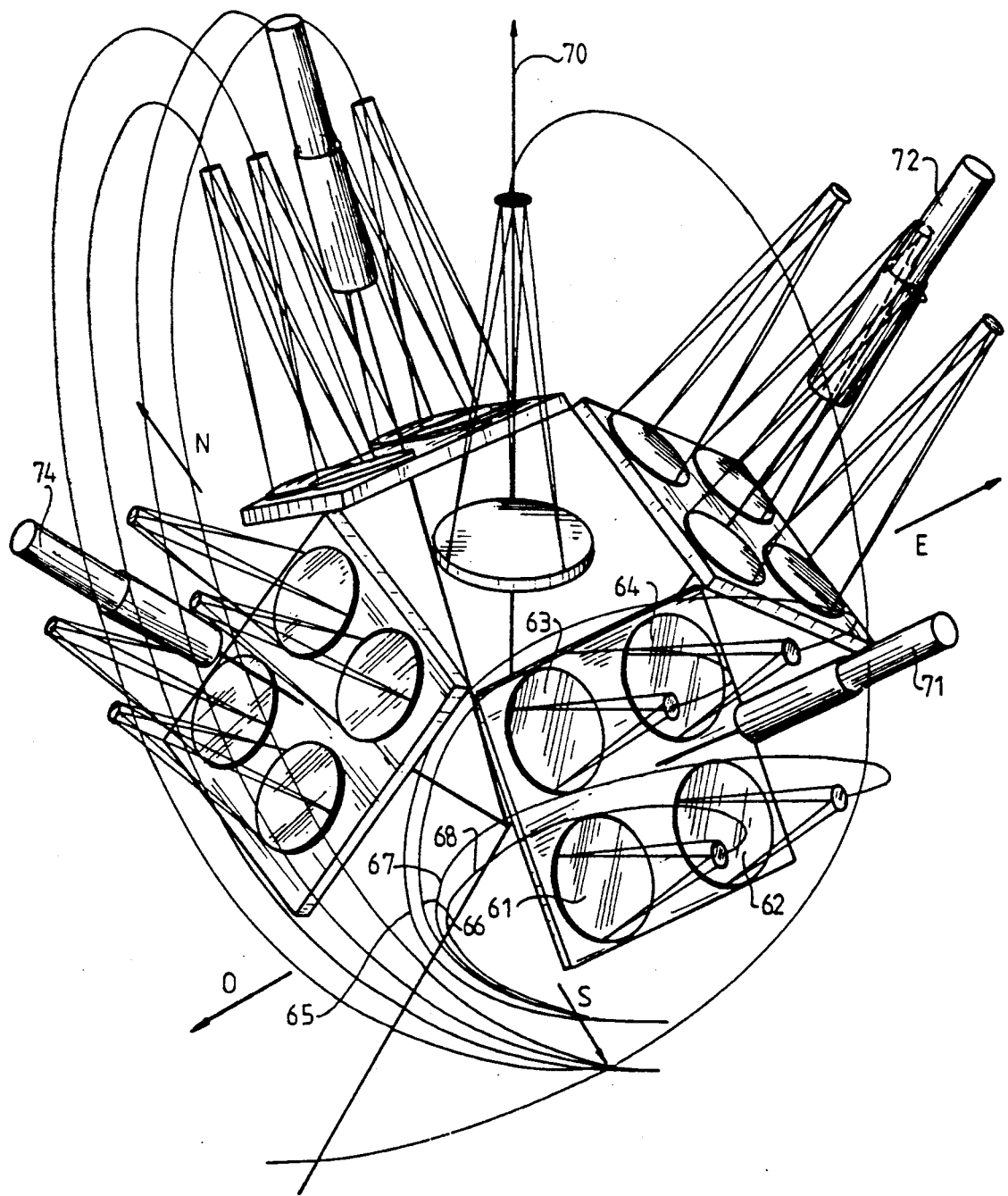
FIG. 6 is a diagrammatic view of the emitter-receiver assembly of the measuring device of the invention.

Preferably, the beam emitted by the laser 1 is passed in the required direction by a transfer optical system and a telescope 2 (FIG. 1) which concentrates the energy of the beam in the measurement zone while diminishing its divergence in relation to that of the beam emerging from the laser. The backscattered flux is received by a receiving telescope 4 which is preferably parallel to the direction of emission of the laser beam. This collected flux is approximately proportional to the surface area of the entrance pupil of the receiving telescope 4 which is thus as large as possible. Nevertheless, in a preferred embodiment, this single telescope may be replaced by a set of collectors 61-64 (see FIG. 6), of parallel axes, each one composed of a parabolic mirror, at the focus of which there is situated the polished end of an optical fibre 65-68. The fibres emerging from the various foci are then collected into a single bundle 5 (see FIG. 1) and brought to the common receiving module 6.

It is likewise possible to use, in reception, a single telescope having a fixed inclination in relation to the vertical and pivoting about a vertical axis.

The light received by the receiving telescope 4 is transmitted by a link by optical fibres 5 to the receiving module 6 which performs the optical analysis of the received light and emits electrical signals which are functions of the spectral shift of the scattered light in relation to the light emitted by the measurement laser 1.

Figure 2:
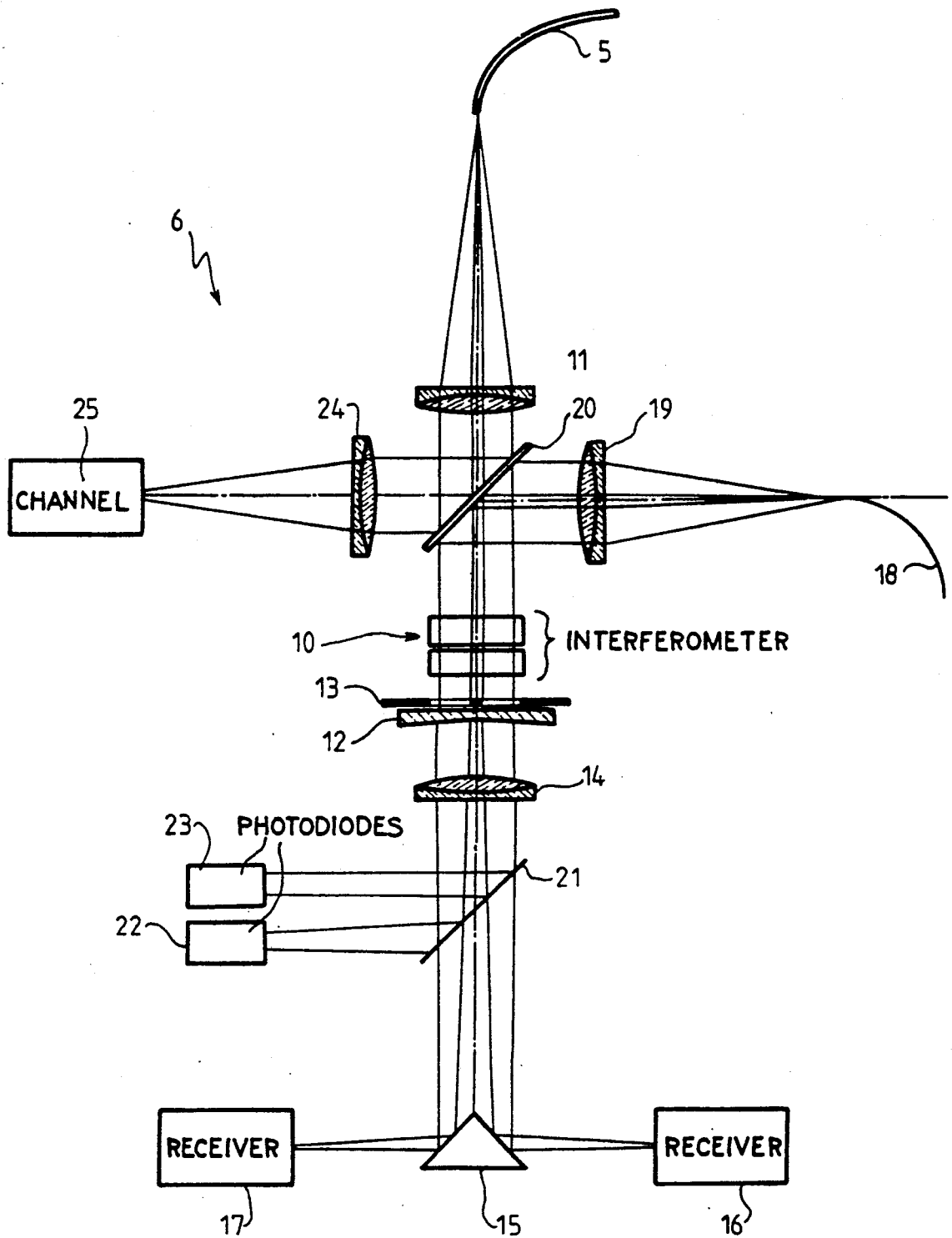
FIG. 2 is a diagram of the receiving module corresponding to the measurement of the speed of the wind in one direction.

The optical analysis of the received light is represented in FIG. 2. An interferometer 10 is illuminated in parallel light by the light to be analyzed. For this purpose, the end of the optical fibre 5 is placed at the focus of an optical system 11.

Figure 4:
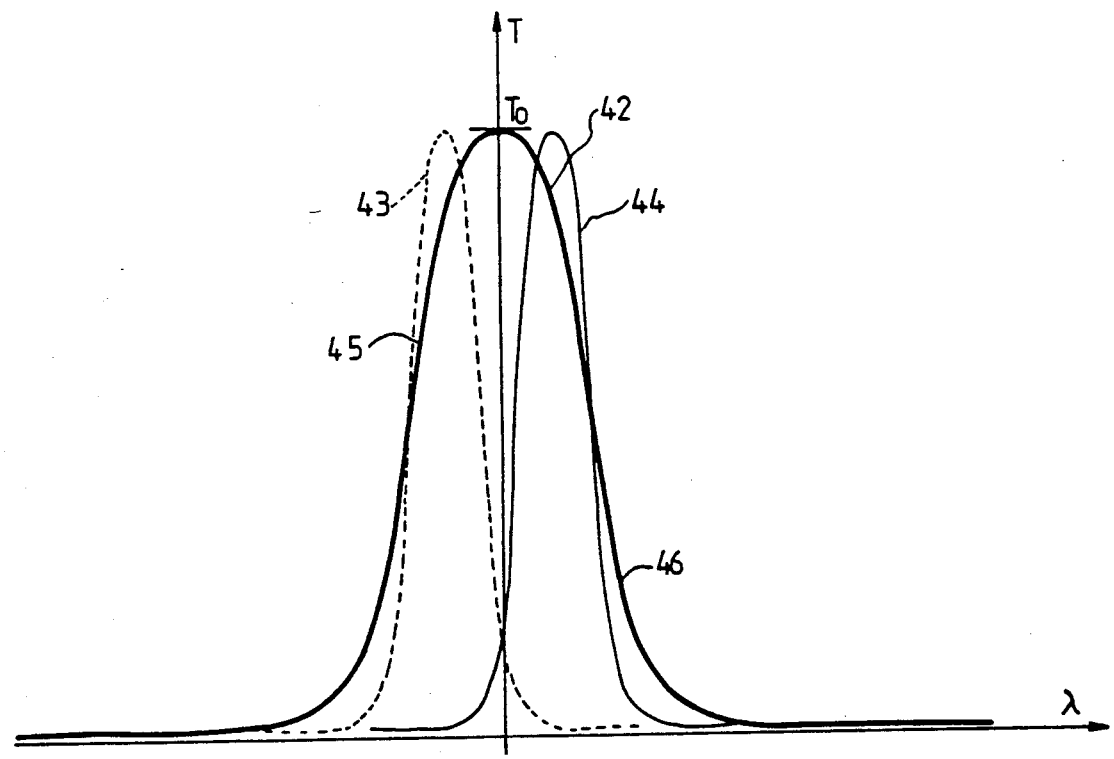
FIG. 4 is a representation of the pass band of the device of FIG. 3 in relation to the spectrum of the backscattered light.
Figure 3:
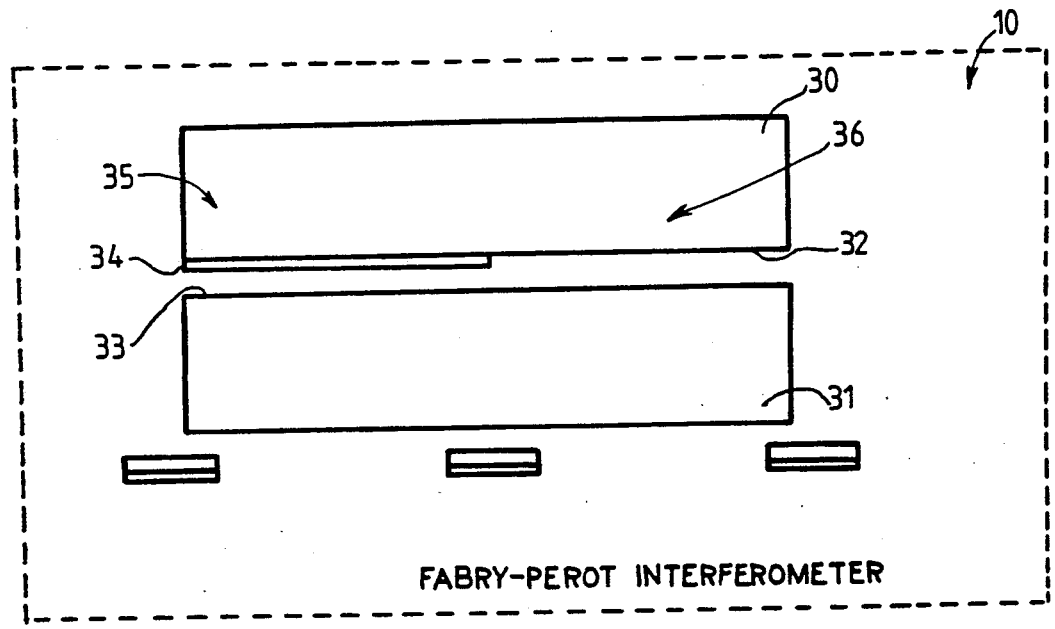
FIG. 3 is a cross sectional view of the interferometric device utilized according to the invention.

The interferometer 10 which is employed is represented in detail in FIG. 3. It comprises two reflective faces 32 and 33 which are parallel and have high coefficients of reflection. These faces are carried by supports 30 and 31. On a part of its surface, preferably one half, one of the faces 32 of the interferometer 10 is covered with a layer of uniform thickness 34. This excess thickness, which has the effect of a phase-shifting layer, is preferably made of silica. In order to improve the stability of this interferometer, it is monolithic, made of silica. The supports 30 and 31 are connected to one another by molecular adhesion. The interferometer thus constructed has a pass band corresponding to that of two Fabry-Perot interferometers, the first having a thickness corresponding to the distance between the faces 32 and 33, the second having a thickness corresponding to the distance between the layer 34 and the face 33. The pass band of this interferometer is thus composed of two peaks 43 and 44 which are represented in FIG. 4. The distance between the faces 32 and 33 and the thickness of the silica layer 34 are chosen in such a manner that the peaks 43 and 44 are centred on the flanks 45 and 46 of a line 42 corresponding to the spectral distribution of the backscattered light when the speed in the sighting direction is zero, that is to say when the sighting direction is vertical.

The structure of the interferometer 10 permits a precise positioning of the two peaks 43 and 44 to be obtained. Furthermore, in the event of possible modification of the pass band due to a variation of the environment (air pressure, temperature . . . ) at the location of the interferometer, this shift takes effect in a similar manner on each one of the lines, introducing a translation without deformation of the pass band.

As we have seen hereinabove, the Doppler effect produces a spectral shift of the backscattered light which is a function of the component of the speed of the wind in the sighting direction. This thus corresponds to a shift of the spectrum 42 in relation to the pass bands 43 and 44.

In the receiving module, downstream of the interferometer, the luminous fluxes which have traversed the interferometer respectively in the zones comprising or not comprising the excess thickness of silica 34 are dissociated. Preferably, this dissociation is carried out by the utilization of two prisms 12 (FIG. 2) producing angular shifts of opposite directions for each one of these beams. These prisms 12 have, in the plane perpendicular to the axis of the light beam, shapes which are complementary to those of the zones 35, 36 defined by the interferometer, permitting them to dissociate the luminous fluxes which have respectively traversed each one of the zones 35, 36 and in order to optimize the separation of these luminous fluxes a mask 13 is interposed between the interferometer 10 and the prisms 12. An optical system 14 causes convergence of each one of the light beams produced by this system on receivers 16 and 17. In order to ensure an improved separation, a reflecting prism 15 receiving on two different faces two beams produced by the optical system 14 is interposed between this optical system and the receivers 16 and 17. These receivers, which must be sensitive, are preferably photomultipliers.

In the absence of any Doppler shift, that is to say for a vertical sighting, the pass bands 43 and 44 (FIG. 4) of each one of the zones of the interferometer 10 occupy a given position in relation to the spectral distribution of the backscattered light 42 and the energy transmitted by each one of these zones is a priori not equal. The relative weighting of the signals produced by the photomultipliers 16 and 17 has a given value which takes the place of a reference.

When the speed of the wind has a component in an inclined sighting direction, due to the Doppler effect, the spectrum of the backscattered light is shifted and the fluxes transmitted by each one of the zones of the interferometer differ. The electrical signals produced by the photomultipliers 16 and 17 exhibit a relative weighting different from the reference relative weighting, reflecting the spectral shift.

The processing of the electrical signals supplied by the photomultipliers 16 and 17 within the processing unit 7 (see FIG. 1) permit the formulation of a signal which directly represents the speed of the wind.

The quality of the measurement essentially necessitates the control of the relative position of the backscattered light in relation to the pass bands 43 and 44. The measurement of the speed of the wind which utilizes this relative shift may be disturbed principally by two phenomena associated with the measuring apparatus which may likewise introduce this type of shift, but which are monitored by regular measurements in the vertical reference sighting direction. It is likewise possible to avoid the vertical aimings and to monitor these phenomena separately, the result of the monitoring being an electrical signal which is taken into consideration by the processing unit which can introduce the adapted compensation.

Figure 5:
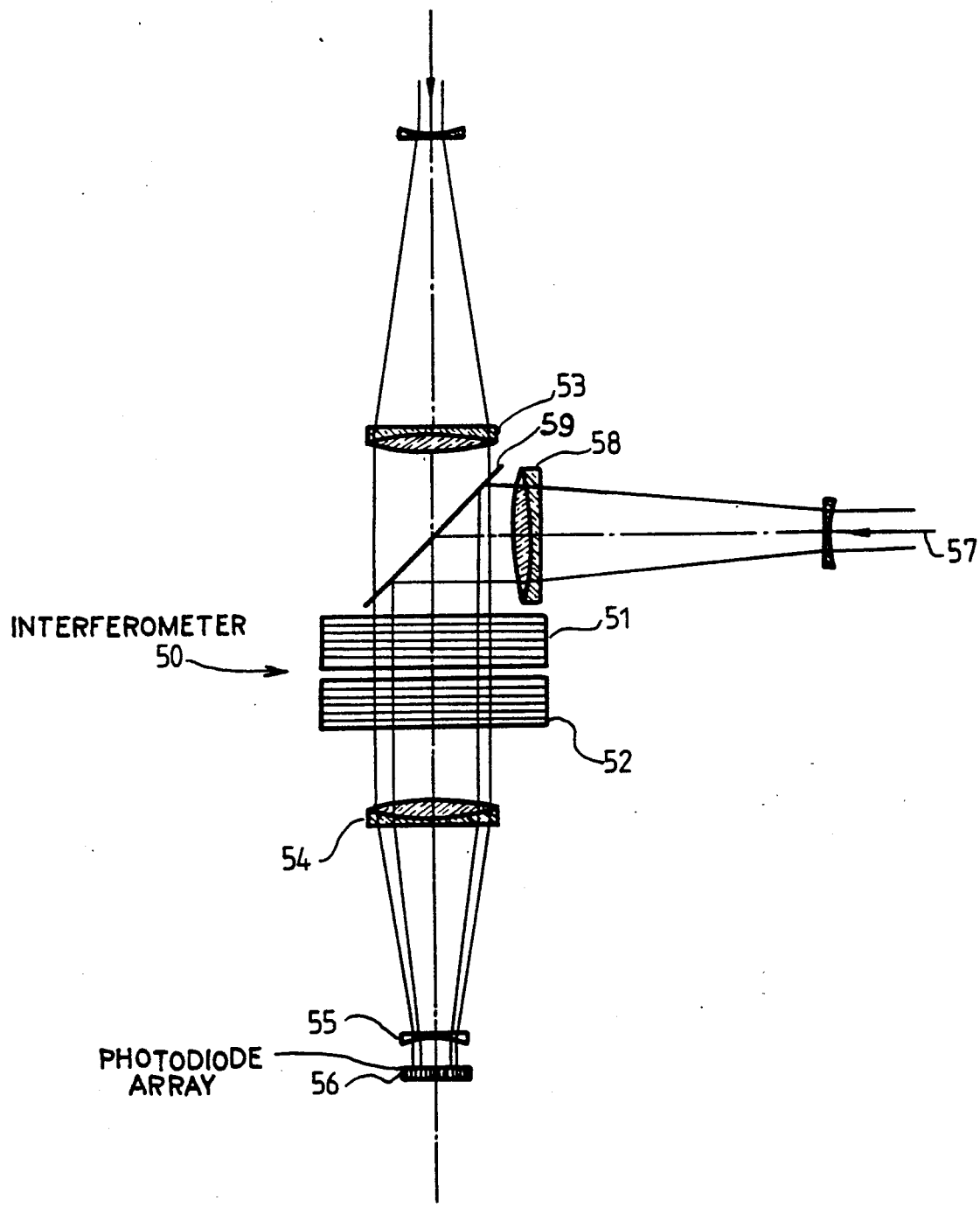
FIG. 5 is a diagrammatic view of the control interferometer.

The first type of shift, due to the apparatus, may originate from a variation of the emission wavelength of the measuring laser 1. This variation may be monitored by the control interferometer represented in FIG. 5 in relation to a helium-neon laser 57, the stability of which is ensured to within $10^{-9}$.

A very small part of the flux emitted by the YAG laser 1 is sampled by an optical fibre in such a manner as to produce, on the basis of the optical system 53, a parallel light flux which traverses a wedge interferometer 50. The wedge interferometer 50 is formed from two highly reflective plates which are slightly inclined in relation to one another, thus forming a system of fringes, the pitch and the position of which are functions of the wavelength. The optical system 54 forms the image of these fringes on a linear array of photodiodes 56. In a similar manner, fringes are produced by the same interferometer 50 by the luminous flux emitted by the helium-neon laser 57. The optical system 58 and the dichroic plate 59 cause the luminous flux emitted by the laser to traverse the wedge interferometer 50, thus forming by the optical system 54-55 a network of fringes on the linear arrays of photodiodes 56 which are superposed on the fringes formed by the luminous flux emanating from the measurement laser.

When, whatever be the reason therefor, the emission wavelength of the measuring laser 1 varies, the network of fringes which is formed by the interferometer 50 is shifted in relation to that formed by this same interferometer from the luminous flux from the helium-neon laser 57. The electrical signal emitted by the linear array 56 of photodiodes is characteristic of this shift and taken into account by the processing unit which may compensate it in the course of the formulation of the quantity characteristic of the speed of the wind.

The second cause of the relative shift is the shift of the pass band 43, 44 (FIG. 4) of the interferometer 10 corresponding to the zones 35 and 36 (FIG. 3). This shift, which may be due to the environment of the interferometer, will be of the same nature on each one of the zones, that is to say that the transfer function of the interferometer will not be modified but simply translated, the relative positions of each one of the pass bands 43 and 44 being retained. This shift is monitored by means of a stabilized helium-neon control laser 18 which, via the optical system 19 and the treated plate 20, traverses the interferometer 10, the mask 13 and the prisms 12 and converges via the optical system 14 and the dichroic plate 21 on two photodiodes 22 and 23. The spectral distribution of the light emitted by the control laser 18 being perfectly stabilized, the diodes 22 and 23 deliver electrical signals which represent the position of the pass band 43, 44. The electrical signals emitted by the photodiodes 22 and 23 are supplied to the processing unit, which can take into account these possible shifts of the pass bands 43 and 44 in the course of the formulation of the signal representing the speed of the wind.

The form of the spectrum of the backscattered light 42 is a function, in particular, of the temperature. The knowledge of this form by virtue of the simultaneous measurement of the temperature permits access to the spectral shift characteristic of the speed of the wind in the sighting direction on the basis of the signals emitted by the photomultipliers 16 and 17. This knowledge is obtained from the analysis of the luminous flux received via an associated channel 25 processing the light received via an optical system 24 and sampled partially by a treated plate 20 from the flux of backscattered light.

The structure of the device and particularly the type of interferometer 10 utilized in order to analyze the spectral shift of the backscattered flux in relation to the emitted flux imparts to it a high intrinsic stability. Furthermore, by the means described hereinabove, the possible residual instabilities are monitored at the receiving module and taken into account in the course of the processing.

This entire arrangement permits the performance of measurements of great accuracy of the spectral shift, although the backscattered signal is very weak.

The device described up to the present measures the speed of the wind in one direction. A complete system of measurement preferably comprises an emission and vertical reception channel 70 (see FIG. 6) used as reference channel, and four measurement channels 71-74 corresponding to horizontal components of speeds in the four cardinal directions, although two orthogonal channels are in fact sufficient. Accordingly, the assembly permits the characterization of the wind speed vector.

The signal backscattered by an atmospheric layer at a given altitude is separated from the emission signal by the duration necessary for the light to execute the path from the emitter to the layer concerned and the return to the receiver.

The time slicing 100 of the backscattered signal thus corresponds to an altitude slicing 110 of the atmospheric layers.

Figure 7:
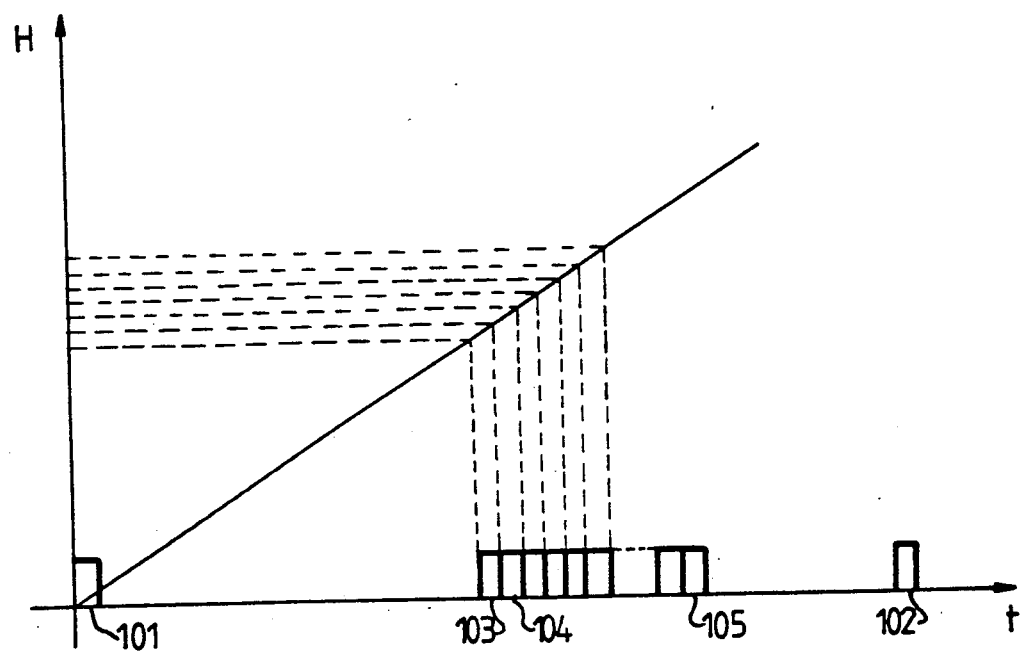
FIG. 7 is a graph illustrating altitude (A) relative to time (t) delay of reflected pulses.

In the example represented in FIG. 7, the pulses 101, 102 emitted by the measurement laser 1 are separated by 33 $10^{-3}$/s, each measurement 103-105 lasts for $10^{-6}$s corresponding to an altitude definition of 150 m, 1,024 measurements are made, the first significant one 103 of which takes place immediately following the unblocking of the detector, i.e. 60 $10^{-6}$s after the emission of the pulse, corresponding to a layer situated at an altitude of 9 km.

These figures may be modified as a function of the altitude range probed.

In particular, it is possible to reduce the measurement duration in order to obtain an improved vertical resolution, especially for the lowest altitudes.

The instrument described hereinabove is optimized for a measurement of the wind within the altitude range 25-60 km. The same principle may be utilized for the lower atmospheric layers (5-25 km), even if the backscattered line comprises a large contribution due to the Mie scattering by the atmospheric dust and aerosols. The characteristics of the interferometer are then modified in consequence.

The optimization in the choice of the parameters of the Doppler Lidar (field, resolution . . . ), will take account of the altitude range under consideration.

We claim:

1. A device for measuring the speed of the wind of medium altitude by the Doppler effect within the visible range, said device comprising:
   a laser (1) emitting pulses of emitted light,
   a telescope (4) receiving a scattered light,
   an interferometer (10) being used to measure a spectral shift of the scattered light in relation to the emitted light and to provide an output which is a function of the spectral shift and,
a processing unit for converting said output into the speed of the wind at the medium altitude,
wherein the interferometer is a Fabry-perot interferometer having two mirrors (30, 31) with a part of one of the two mirrors (30, 31) of the interferometer (10) covered with an excess thickness (34) to form two filters, the spacing of the two mirrors (30, 31) and the excess thickness (34) determined in such a manner that the pass bands (43, 44) of each one of the two filters thus constructed are centered on the flanks of the spectral distribution of a backscattered light (42).

2. The measuring device as claimed in claim 1, which comprises a double prism (12) placed at an exit of the interferometer (10) to separate the luminous flux corresponding to each one of the filters respectively.

3. The measuring device as claimed in claim 1, which comprises a vertical reception channel (70) used as a reference channel.

4. The measuring device as claimed in claim 1, which comprises at least two measurement channels (71, 74) corresponding to speed components in different cardinal directions.

5. The measuring device as claimed in claim 1, which comprises a continuous wave laser (57) emitting a beam of stable wavelength, which beam is utilized to monitor the stability of the interferometer (10).

6. The measuring device as claimed in claim 1, wherein a receiving system (4) comprises a plurality of telescopes (61-64) for each direction of measurement.

7. The measuring device as claimed in claim 1, wherein a receiving system (4) comprises a single pivoting structure permitting measurements in different directions.

8. The measuring device as claimed in claim 1, which comprises optical fibres (65-68) ensuring the link between receiving telescopes (61-64) and an analysis device (6).

9. The measuring device as claimed in claim 1, which comprises a telescope (2) reducing the divergence of a beam emitted by the laser (1).

10. The device as claimed in claim 1, in which the mirrors of the interferometer (10) are fixed to one another by molecular adhesion.

11. A device for measuring the speed of the wind at medium altitude by the Doppier effect within the visible frequency range, said device comprising:
- a laser (1) emitting pulses of an emitted light,
- a telescope (4) receiving a scattered light,
- an interferometer (10) being used to measure a spectral shift of the scattered light in relation to the emitted light and to provide an output, which is a function of the spectral shift and,
- a processing unit for converting said output into the speed of the wind at the medium altitude, wherein the interferometer is a Fabry-Perot interferometer having two mirrors (30, 31) with a part of one of the two mirrors (30, 31) of the interferometer (10) covered with an excess thickness (34) to form two separate filters, the spacing of the two mirrors (30, 31) and the excess thickness (34) determined in such a manner that the pass bands (43, 44) of each one of the two filters thus constructed are centered on the flanks of the spectral distribution of a backscattered light (442), said device including a double prism (12) placed at an exit of the interferometer (10) to separate the luminous flux corresponding to each one of the filters respectively, a vertical reception channel (70) used as a reference channel, at least two measurement channels (71, 74) corresponding to speed components in different cardinal directions, a continuous wave laser (57) emitting a beam of stable wavelength, which beam is utilized to monitor the stability of the interferometer (10), a receiving system (4) including a plurality of telescopes (61-64) for each direction of measurement and a single pivoting structure for permitting measurements in different directions, said measuring device including optical fibres (65-68) ensuring the link between the telescopes (61-64) of the receiving system and an analysis device (6) and a telescope (2) reducing the divergence of a beam emitted by the first-mentioned laser (1), and the mirrors of the interferometer (10) being fixed to one another by molecular adhesion.

* * * * *